(12) United States Patent
Otsuki et al.

(10) Patent No.: US 7,102,535 B2
(45) Date of Patent: Sep. 5, 2006

(54) MOBILE COMMUNICATION APPARATUS, MONITORING APPARATUS, MONITORING SYSTEM, MONITORING METHOD, MONITORING PROGRAM, AND COMPUTER-READABLE RECORDING MEDIUM CONTAINING THE MONITORING PROGRAM

(75) Inventors: Yoshiyuki Otsuki, Kyoto (JP); Yoshihiko Fukushima, Kyoto (JP); Masayuki Oyagi, Kyoto (JP)

(73) Assignee: Omron Corporation, Kyoto (JP)

( * ) Notice: Subject to any disclaimer, the term of this patent is extended or adjusted under 35 U.S.C. 154(b) by 118 days.

(21) Appl. No.: 10/486,289

(22) PCT Filed: Aug. 2, 2002

(86) PCT No.: PCT/JP02/07940

§ 371 (c)(1),
(2), (4) Date: Feb. 9, 2004

(87) PCT Pub. No.: WO03/017223

PCT Pub. Date: Feb. 27, 2003

(65) Prior Publication Data

US 2004/0235516 A1 Nov. 25, 2004

(30) Foreign Application Priority Data

Aug. 10, 2001 (JP) ............................. 2001-245055

(51) Int. Cl.
G05B 23/02 (2006.01)

(52) U.S. Cl. .................... 340/902; 340/426.2; 340/3.1; 455/569.2

(58) Field of Classification Search ................
340/426.25–426.34, 426.21, 426.2, 539.14,
340/539.16, 546, 565, 3.1, 3.2, 286.06, 426.36,
340/426.1; 455/569.2
See application file for complete search history.

(56) References Cited

U.S. PATENT DOCUMENTS

| 5,534,845 | A  | * | 7/1996  | Issa et al. ............... 340/425.5 |
| 5,742,666 | A  | * | 4/1998  | Alpert ..................... 455/404.2 |
| 6,163,251 | A  | * | 12/2000 | Escareno et al. ...... 340/426.21 |
| 6,442,241 | B1 | * | 8/2002  | Tsumpes ..................... 379/45 |
| 6,633,231 | B1 | * | 10/2003 | Okamoto et al. ...... 340/539.11 |
| 6,674,358 | B1 | * | 1/2004  | Tinsley ..................... 340/7.63 |
| 6,690,302 | B1 | * | 2/2004  | Inomata ..................... 340/989 |
| 6,696,922 | B1 | * | 2/2004  | Wong et al. ............... 340/7.32 |
| 2003/0043037 | A1 | * | 3/2003  | Lay ........................ 340/568.1 |

FOREIGN PATENT DOCUMENTS

JP 11-086198 3/1999

(Continued)

*Primary Examiner*—Daniel Wu
*Assistant Examiner*—Jennifer Mehmood
(74) *Attorney, Agent, or Firm*—Foley & Lardner LLP

(57) ABSTRACT

A mobile communication device (3) can be disconnected form a vehicle monitoring apparatus (1) arranged on vehicle for sensing the state of the vehicle as a monitoring object and transmitting sensing data representing the sensing result. The mobile communication device (3) can also be connected via a communication network (4) to a report destination. The mobile communication device (3) includes a judgment unit (41a) for judging the state of the vehicle according to the sensing data, a decision unit (41b) for deciding a report destination to be connected according to the judgment result of the judgment unit (41a), and a communication unit (42) for receiving the sensing data and establishing a connection with the report destination decided by the decision unit (41b). Thus, it is possible to report the abnormal state of the vehicle sensed to an appropriate report destination in a short time.

21 Claims, 10 Drawing Sheets

FOREIGN PATENT DOCUMENTS

| | | |
|---|---|---|
| JP | 11-355478 | 12/1999 |
| JP | 2000-052932 | 2/2000 |
| JP | 2001-116556 | 4/2001 |
| JP | 2001-160192 | 6/2001 |
| JP | 2001-189814 | 7/2001 |
| KR | 0161957 | 12/1998 |
| KR | 1999-0064987 | 8/1999 |

\* cited by examiner

FIG. 9

| SENSORS | SENSING RESULTS | ABNORMALITY LEVEL |
|---|---|---|
| VIBRATION SENSOR | VIBRATION OF VEHICLE | 1 |
| ACOUSTIC SENSOR | SOUND AROUND VEHICLE | 1 |
| ... | ... | ... |
| DOOR SENSOR | OPENING/CLOSING OF DOOR | 2 |
| TRUNK SENSOR | OPENING/CLOSING OF TRUNK | 2 |
| ... | ... | ... |
| KEY CYLINDER SENSOR | ABNORMALITY IN KEY CYLINDER | 3 |
| ... | ... | ... |

FIG. 10

| ABNORMALITY LEVEL | REPORT DESTINATION |
|---|---|
| 1 | SECURITY COMPANY |
| 2 | HOME |
| 3 | POLICE STATION |

MOBILE COMMUNICATION APPARATUS, MONITORING APPARATUS, MONITORING SYSTEM, MONITORING METHOD, MONITORING PROGRAM, AND COMPUTER-READABLE RECORDING MEDIUM CONTAINING THE MONITORING PROGRAM

TECHNICAL FIELD

The present invention relates to a monitoring system for monitoring a monitoring object, such as a vehicle theft monitoring system, and also relates to a mobile communication apparatus and a monitoring apparatus which constitute the monitoring system.

BACKGROUND ART

On the ground of recent increase of car theft, various types of vehicle alarm systems have been proposed.

For instance, Japanese Laid-Open Patent Application No. 2000-52932 (published on Feb. 22, 2000) discloses "TIE-UP SYSTEM BETWEEN SECURITY AND EMERGENCY COMMUNICATION SERVICE". This system is arranged in such a way that an in-vehicle security device (monitoring apparatus) for issuing a warning after sensing the abnormality concerning a vehicle is connected to an emergency communication service device which notifies a response center of an emergency state, so that information can be transmitted between the in-vehicle security device and the emergency communication service device, and the emergency communication service device having received the report of the abnormality from the security device notifies user's mobile phone or pager of the abnormality.

This conventional system, however, has such a problem that, on the occurrence of abnormality of a vehicle, the abnormality is notified to the user's mobile phone and the like via the response center, so that the report is completed only after a certain period of time has past from the occurrence of the abnormality. This is because the system requires a period for connecting the security device with the response center and a period for connecting the response center with the user's mobile phone and the like.

Furthermore, the user notified of the abnormality is normally away from the vehicle, and hence cannot deal with the abnormality by him/herself in most cases. Consequently, the user having been notified of the abnormality from the response center has to further contact the police and the like. The user on this occasion is required to determine a report destination and make a call using a mobile phone. These determination and operation of the mobile phone often take time (e.g. to find out the telephone number of the report destination), thereby causing the report to the police, etc. to be further delayed.

Although reports made through such system are often urgent ones and require prompt action, the conventional system may cause delay as above, so that one cannot swiftly take countermeasures to the abnormality and thus the damage is likely to spread.

Note that, such a problem is conspicuous in vehicle theft monitoring systems, but also occurs in all sorts of monitoring systems.

The present invention was made to solve this problem, and an objective of the present invention is to provide a monitoring system which can make a report to a suitable report destination in a short time, a mobile communication apparatus and monitoring apparatus constituting such a monitoring system, and a monitoring method. The objective of the present invention includes the provision of a monitoring program for realizing the above-mentioned monitoring system, and a computer-readable recording medium storing the monitoring program.

DISCLOSURE OF INVENTION

To solve the above-described problem, a mobile communication apparatus of the present invention, which is: detachable from a monitoring apparatus that senses a state of a monitoring object, transmits sensing data indicating a sensing result; and is provided in the monitoring object; and connectable to a report destination via a communication network, comprises: a receiving unit for receiving the sensing data; a judgment unit for judging the state of the monitoring object, in accordance with the sensing data; a decision unit for determining a report destination to which connection should be made, in accordance with a judgment result produced by the judgment unit; and a communication unit for establishing connection to the report destination determined by the decision unit.

As described above, a conventional system is arranged in such a manner that, when an abnormality concerning a monitoring object occurs, information regarding the abnormality is supplied from a monitoring apparatus to a mobile communication apparatus (mobile phone) of the user, via a response center. Then the user who has been received the report has to determine to which report destination a report is made, by operating the mobile communication apparatus. For this reason, the conventional system has such drawbacks that the report of the abnormality to the user may be delayed, and the report from the user to the report destination may also be delayed.

On the contrary, according to the above-described arrangement of the present invention, the state of a monitoring object is sensed, and then sensing data indicating the sensing result is supplied to a mobile communication apparatus. This mobile communication apparatus is provided independently of the monitoring object so that the user can carry the mobile communication apparatus. In this mobile communication apparatus, a judgment unit judges the state of the monitoring object, in accordance with the sensing data, and a decision unit determines a report destination in accordance with the judgment result. Thus, it is possible to smoothly make a report to a report destination suitable for the type of abnormality of the monitoring object, so that the occurrence of abnormality is quickly reported to a suitable report destination.

Also, the monitoring apparatus in accordance with the present invention, which is provided in a monitoring object and can carry out data transmission with a mobile communication apparatus which is provided independently of the monitoring object, is characterized by comprising: a sensing unit for sensing a state of the monitoring object; a judgment unit for judging the state of the monitoring object, in accordance with a sensing result produced by the sensing unit; a generating unit for generating, in accordance with a judgment result produced by the judgment unit, report destination data which specifies a report destination to which a report should be made by the mobile communication apparatus; and a transmitting unit for transmitting the report destination data to the mobile communication apparatus.

As in this arrangement, it is possible to obtain effects similar to those of the above-described mobile communication apparatus, by judging the state of the monitoring object in the monitoring apparatus provided in the monitoring object, and determining the report destination in accordance with the judgment result.

For a fuller understanding of the nature and advantages of the invention, reference should be made to the ensuing detailed description taken in conjunction with the accompanying drawings.

BRIEF DESCRIPTION OF DRAWINGS

FIG. 9 is a table, showing an example of coordination between abnormality levels and sensing results of respective sensors, used in the vehicle theft monitoring system in FIG. 1.

FIG. 10 is a table, showing an example of coordination between abnormality levels and report destinations, used in the vehicle theft monitoring system in FIG. 1.

BEST MODE FOR CARRYING OUT THE INVENTION

One embodiment of the present invention is described below with reference to FIGS. 1–11. In the present embodiment, what is discussed as a monitoring system of the present invention is a vehicle theft monitoring system.

(System Configuration)

Figure 2:
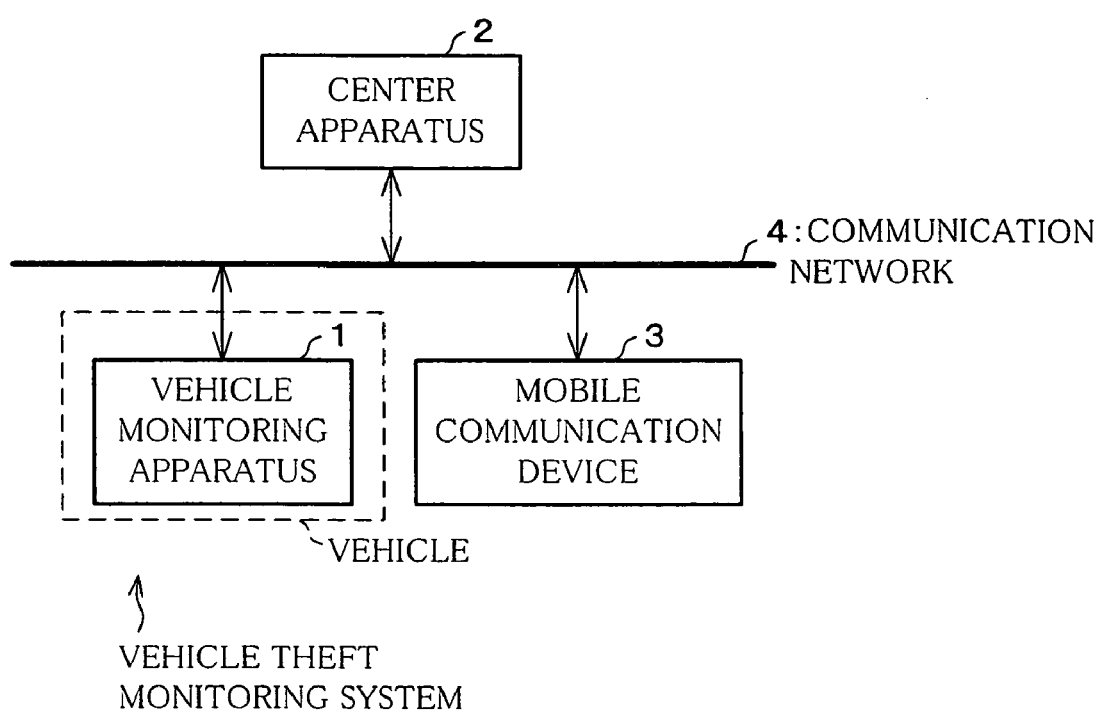
FIG. 2 is a block diagram, schematically illustrating the vehicle theft monitoring system in FIG. 1.

FIG. 2 is a block diagram, schematically showing the vehicle theft monitoring system in accordance with the present embodiment. As in the figure, the vehicle theft monitoring system includes a vehicle monitoring apparatus (monitoring apparatus) 1, center apparatus (data distribution apparatus) 2, and mobile communication device (mobile communication apparatus) 3 which are connected with each other via a communication network 4. The communication network 4 in the present embodiment includes a packet-based wireless telephony communication network, the Internet, and base stations for them.

(Vehicle Monitoring Apparatus)

Figure 3:
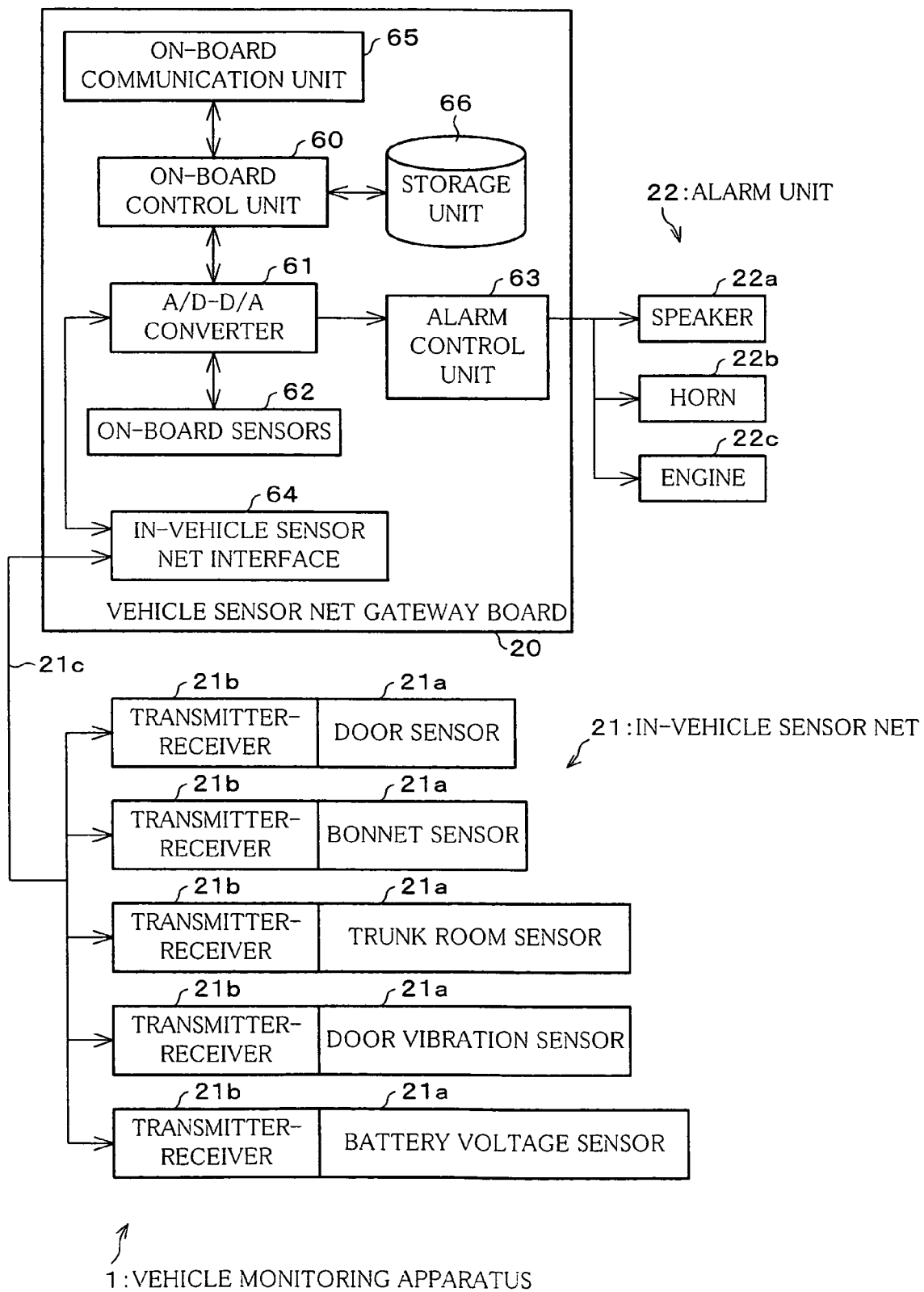
FIG. 3 is a block diagram, showing a vehicle monitoring apparatus included in the vehicle theft monitoring system in FIG. 1.

FIG. 3 is a block diagram, showing the vehicle monitoring apparatus 1. As in the figure, the vehicle monitoring apparatus 1 includes a vehicle sensor net gateway board 20, in-vehicle sensor net 21, and alarm unit 22. The vehicle monitoring apparatus 1 is an on-board apparatus for collecting vehicle information (sensing data), communicating with the outside communication network 4, and controlling various parts of the vehicle. Note that, any types of vehicles such as passenger cars, trucks, buses, motorbikes, and bicycles are denoted by "vehicle". Hereinafter, descriptions are given on the assumption that "vehicle" denotes a passenger car.

The in-vehicle sensor net 21 is provided for sensing various types of vehicle information, especially information concerning preparations for theft, and is made up of various sensors 21a, transmitter-receivers 21b of these sensors 21a, and an in-vehicle network 21c connecting the sensors with a below-mentioned in-vehicle sensor net interface 64 of the vehicle sensor net gateway board 20.

The sensors 21a are roughly classified into sensors as standard equipments of the vehicle and sensors as optional equipments of the vehicle. The sensors 21a in the present embodiment are such as: a door sensor which senses close-open operations of doors and a trunk of the vehicle and also the lighting of an interior light operated in accordance with the close-open operations; a bonnet sensor which senses close-open operations of a bonnet; a trunk room sensor which senses close-open operations of a trunk; a door vibration sensor which senses the vibration of doors, a battery voltage sensor which senses the variation of a battery voltage; a key cylinder sensor which senses abnormalities regarding a key cylinder of the vehicle; a radar sensor (or infrared sensor) which senses an intruder inside the vehicle and an object approaching the vehicle; a running state sensor which senses the state of running of the vehicle; an acoustic sensor which senses sounds such as noise of braking a glass window and noise of opening/closing doors; and a seating sensor which senses pressures applied on seats and a floor mat. Note that, FIG. 3 shows only some of these sensors 21a.

In the present embodiment, on-board sensors 62 disposed on the vehicle sensor net gateway board 20 are also the sensors 21a of the in-vehicle sensor net 21. However, these on-board sensors 62 can be directly connected to a below-mentioned A/D-D/A converter 61 without the interposition of the transmitter-receivers 21b, in-vehicle network 21c, and in-vehicle sensor net interface 64.

Examples of the on-board sensors 62 include a vibration sensor for sensing abnormal vibration of the vehicle body, a tilt sensor for sensing the tilt of the vehicle, and an acceleration sensor for sensing the acceleration of the vehicle.

In addition to the above, various types of sensors can be adopted as the sensors 21a. The more the number and types of the sensors 21a are increased, the more the preparations for theft can be precisely sensed. However, the number and types of the sensors are preferably determined in consideration of cost/security level tradeoffs.

The alarm unit 22 alerts and warns those who preparing for theft (i.e. those who causing abnormality of the vehicle) in order to deter the theft. The alarm unit 22 is, for instance, made up of some of standard equipments of the vehicle, such as a speaker 22a, horn 22b, and engine 22c, and thus can perform warnings such as producing a warning sound from the speaker 22a, blowing the horn 22b, and forcibly stop the engine 22c when the same has been started up.

The vehicle sensor net gateway board 20 includes an on-board control unit 60, A/D-D/A converter 61, the above-mentioned on-board sensors 62, alarm control unit 63, in-vehicle sensor net interface 64, on-board communication unit 65, and storage unit 66.

The on-board control unit 60 is, for instance, chiefly made up of a microcomputer. The on-board control unit 60 is provided for collecting vehicle information and carrying out controls based on the vehicle information.

The storage unit 66 is constituted by a known memory such as RAM (Random Access Memory) and ROM (Read Only Memory), and stores various programs and sets of data used by the on-board control unit 60.

The on-board communication unit 65 is provided for communicating with the communication network 4 outside of the vehicle, under the control of the on-board control unit 60. The on-board communication unit 65 thus functions as an interface for data transmission/reception to/from the mobile communication device 3.

In the present embodiment, the communication between the on-board communication unit 65 and the mobile communication device 3 is preferably packet-based wireless telephony communication. When this packet-based wireless telephony communication is adopted, a charge is made in accordance with the number of packets used for data transmission. For this reason, even if the on-board communication unit 65 and the mobile communication device 3 are virtually always-connected with each other, intermittent data transmission by the on-board communication unit 65 can be carried out efficiently and economically.

The in-vehicle sensor net interface 64 is provided for causing the vehicle information sent from the sensors 21a via the in-vehicle network 21c to be fetched in a vehicle sensor net gateway board 20, and also for transmitting a sensor control signal sent from the on-board unit 60 to the sensors 21a, via the in-vehicle network 21c.

The alarm control unit 63 is provided for sending an alarm unit control signal, which is for causing the alarm unit 22 to carry out the warning, to the alarm unit 22, in response to alarm unit control information sent from the on-board control unit 60.

The A/D-D/A converter 61 converts the sensor control signal and the alarm unit control signal, which are digital signals supplied from the on-board control unit 60, to analog signals, and sends these analog signals to the in-vehicle sensor net interface 64 and the alarm control unit 22, respectively. The A/D-D/A converter 61 also converts the vehicle information, which is analog signals supplied from the sensors 21a, to digital signals and sends these digital signals to the on-board control unit 60. Note that, the signals supplied from the sensors 21a may be digital signals, and in this case the conversion by the A/D-D/A converter 61 is unnecessary.

The vehicle monitoring apparatus 1 can be switched between a vehicle monitoring state and a non-monitoring state by a remote control device and the like, which is not illustrated.

(Mobile Communication Device)

Figure 4:
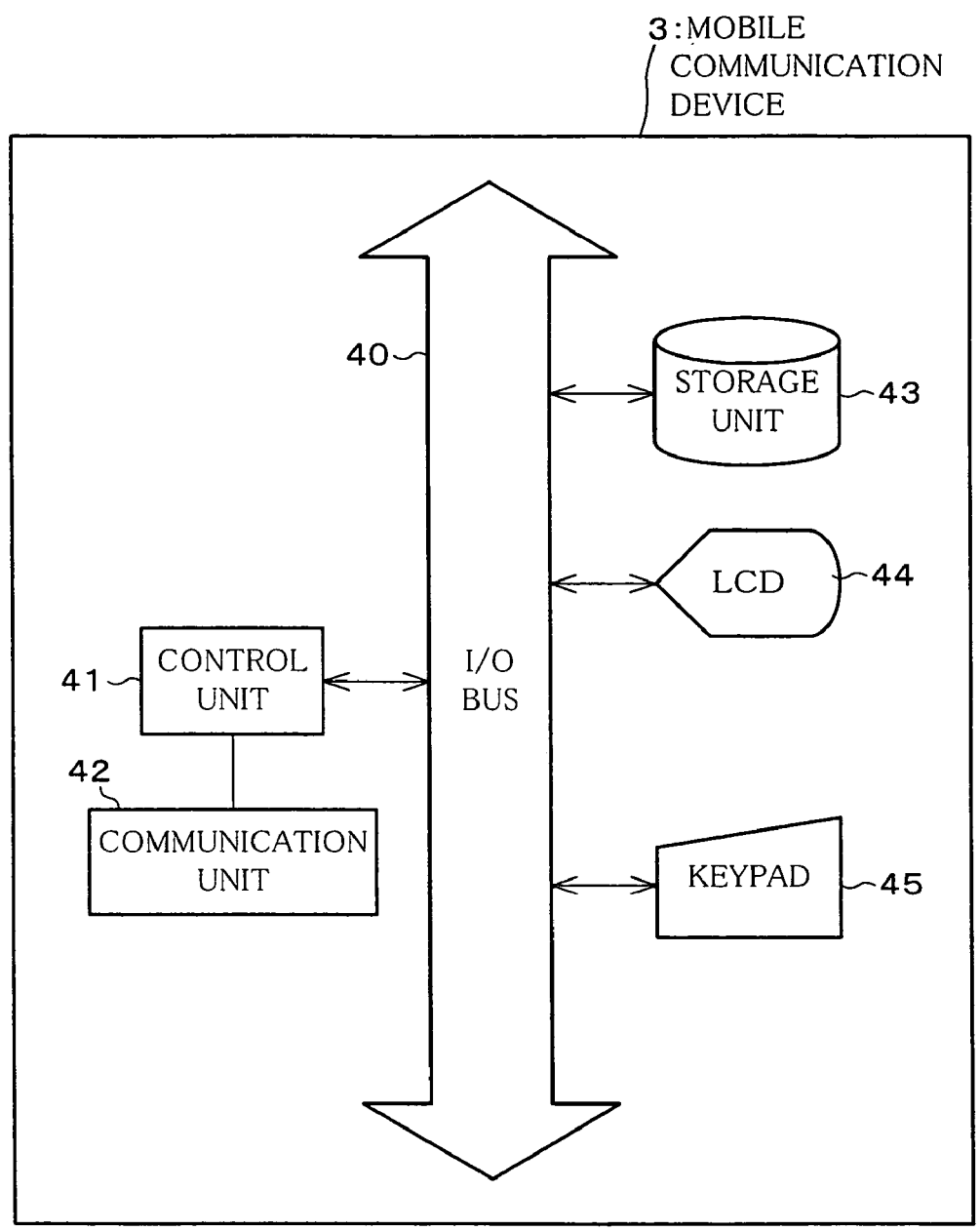
FIG. 4 is a block diagram, illustrating a mobile communication device included in the vehicle theft monitoring system in FIG. 1.

FIG. 4 is a block diagram showing a structure of the mobile communication device 3. As in the figure, the mobile communication device 3 is arranged in such a manner that a control unit 41 and a communication unit 42, a storage unit 43, an LCD (Liquid Crystal Display) 44, and an keypad 45 are connected with each other through an I/O bus 40 as an interface. In the present embodiment, the mobile communication device 3 is a mobile phone terminal of the user of the vehicle, so that the user can send and receive data to/from the vehicle monitoring apparatus 1 and the center apparatus 2, using the mobile communication device 3. Note that, the mobile communication device 3 may be a combination of a mobile phone terminal and a PDA (Personal Digital Assistant).

The control unit 41 is, for instance, mainly made up of a microcomputer, and controls the mobile communication device 3 in various ways, in accordance with instructions inputted through the keypad 45 and those from the base stations.

The communication unit 42 is a known communication circuit which carries out packet-based wireless telephony communication with the vehicle monitoring apparatus 1 and center apparatus 2, under the control of the control unit 41.

The storage unit 43 is constituted by a publicly-known memory typified by RAM and ROM, and stores, apart from a telephone number database, various programs and sets of data used by the control unit 41.

The LCD 44 visually displays various messages for the user, under the control of the control unit 41. The LCD 44 can also display the telephone number of the called party and the hour.

The keypad 45 is made up of various keys such as numeric keys and a navigation key, and is an interface for letting the user input various types of information including telephone numbers.

Although not being shown in FIG. 4, the mobile communication device 3 has all functions required for a typical telephone set, so as to include (i) a microphone for capturing the voice of the calling party and (ii) a speaker for reproducing the voice of the called party.

(Center Apparatus)

Figure 5:
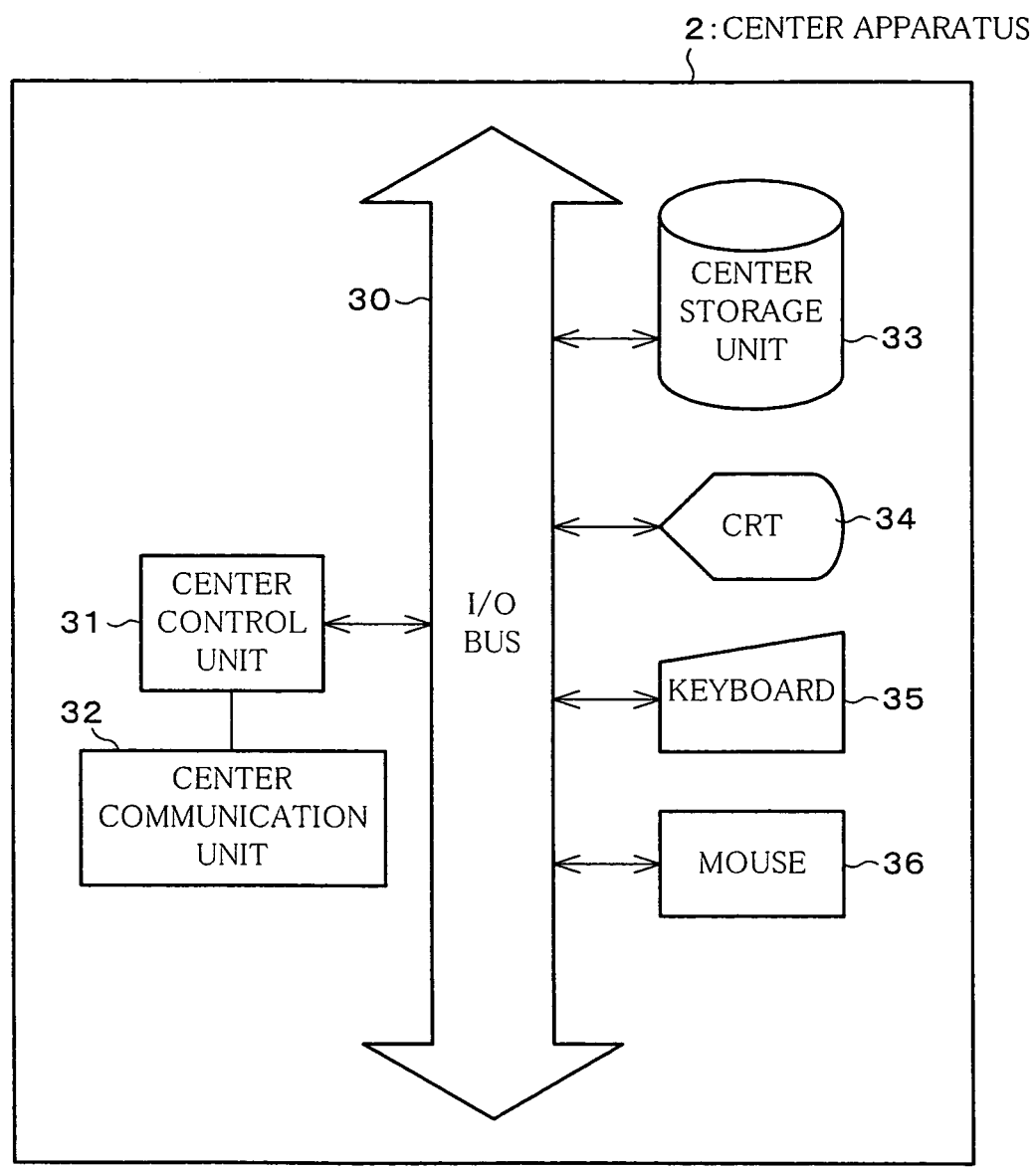
FIG. 5 is a block diagram, illustrating a center apparatus included in the vehicle theft monitoring system in FIG. 1.

FIG. 5 is a block diagram showing a structure of the center apparatus 2. As in the figure, the center apparatus 2 is arranged in such a manner that a center control unit 31 and a center communication unit 32, center storage unit 33, CRT (Cathode Ray Tube) 34, keyboard 35, and mouse 36 are connected with each other through an I/O bus 30 as an interface.

The center control unit 31 is, for instance, mainly made up of a microcomputer, and controls the center apparatus 2.

The center communication unit 32 carries out the communication with the vehicle monitoring apparatus 1 and the mobile communication device 3, under the control of the center control unit 31. The center communication unit 32 thus functions as an interface to the outside. The packet-based wireless telephony communication between the center communication unit 32 and the on-board communication unit 22 is carried out in the manner as above.

The center storage unit 33 is mainly made up of a publicly-known memory typified by RAM and ROM or a publicly-known storage device typified by magnetic disk drives and optical disk drives. The center storage unit 33 thus stores various types of information under the control of the center control unit 31, and functions as a database for storing programs and sets of data to be supplied to the vehicle monitoring apparatus 1 and the mobile communication device 3.

The CRT 34, keyboard 35, and mouse 36 are all publicly-known user interface devices, and are used for allowing the administrator of the center apparatus 2 to give instructions to the center apparatus 2, or to confirm or modify the contents stored in the center storage unit 33. Various types of information are inputted using these interface devices, thereby being stored in the center storage unit 33.

(Operation of Vehicle Theft Monitoring System)

Now, referring to FIGS. 1 and 6–8, the operation of the present vehicle theft monitoring system will be discussed below.

Figure 1:
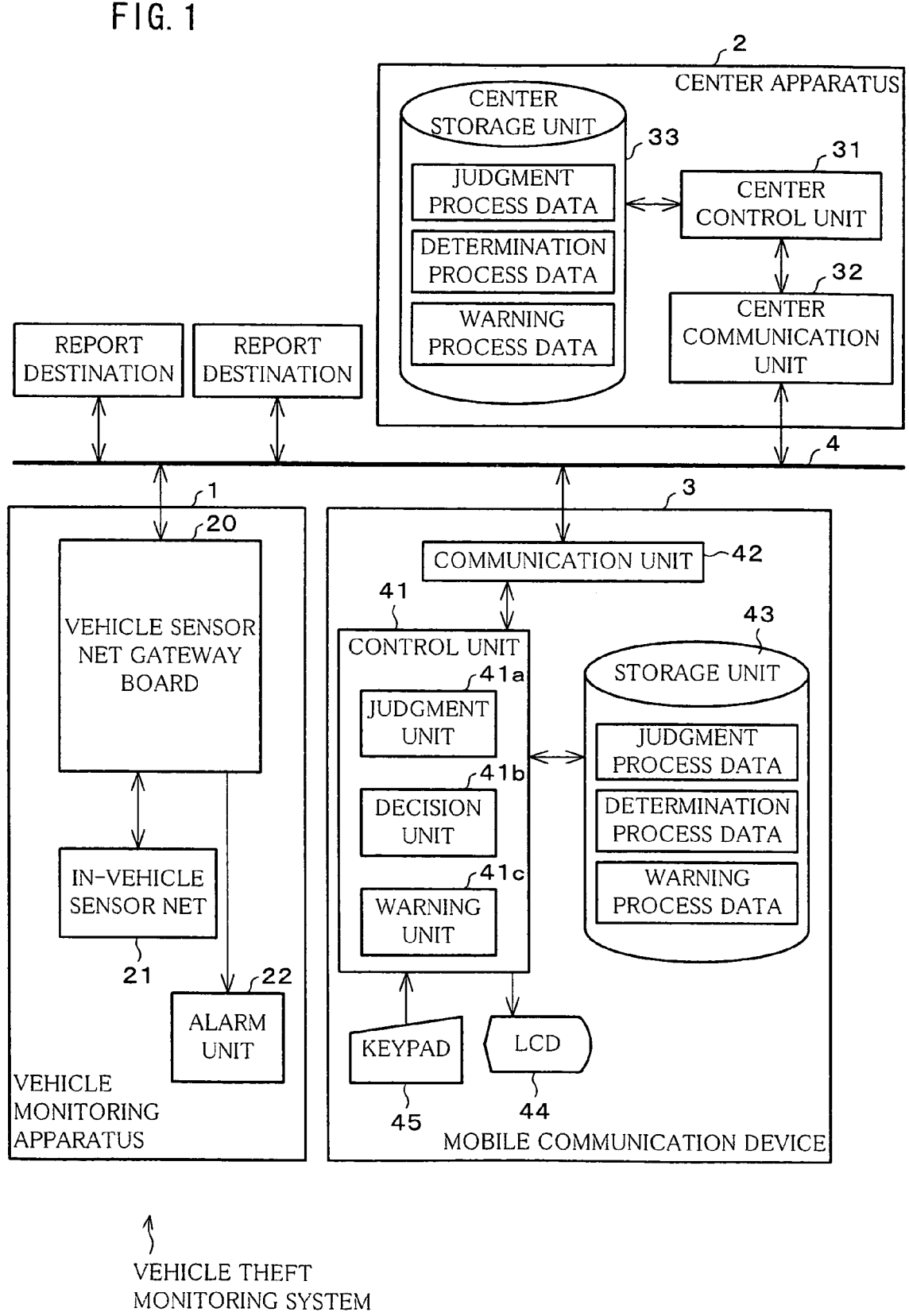
FIG. 1 is a functional block diagram, illustrating functional blocks of a vehicle theft monitoring system in accordance with an embodiment of the present invention.
Figure 6:
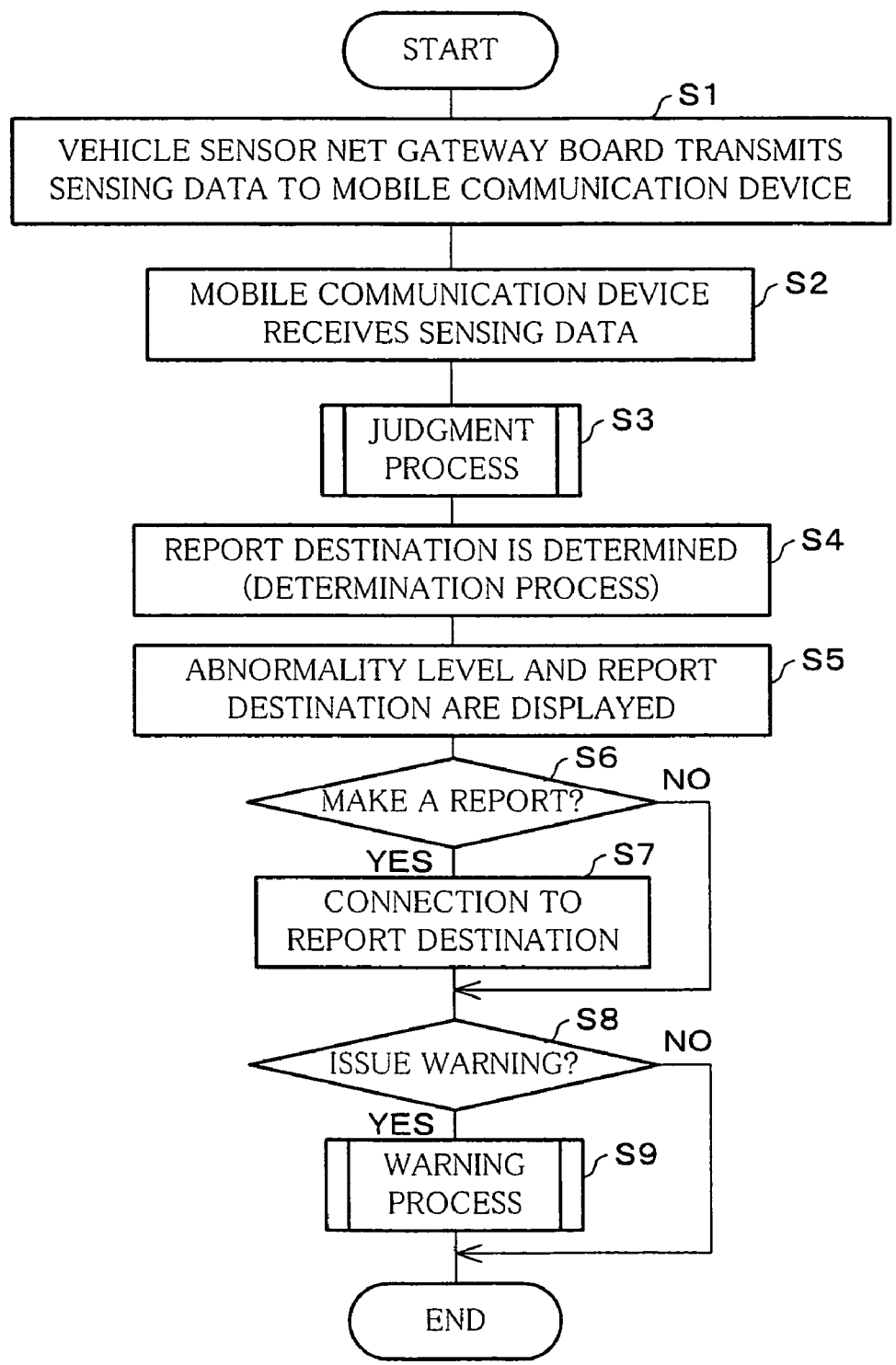
FIG. 6 is a flow chart, showing the flow of steps carried out in the vehicle theft monitoring system in FIG. 1.
Figure 7:
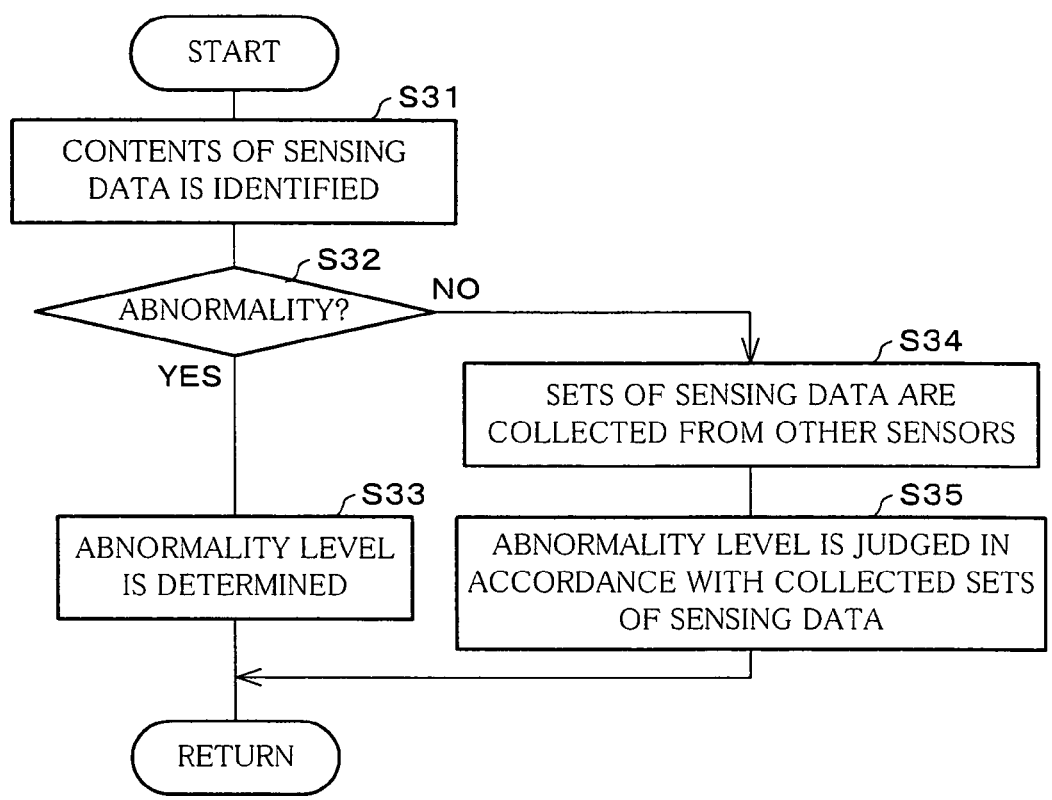
FIG. 7 is a flow chart, specifically showing a judgment process in the flow chart in FIG. 6.
Figure 8:
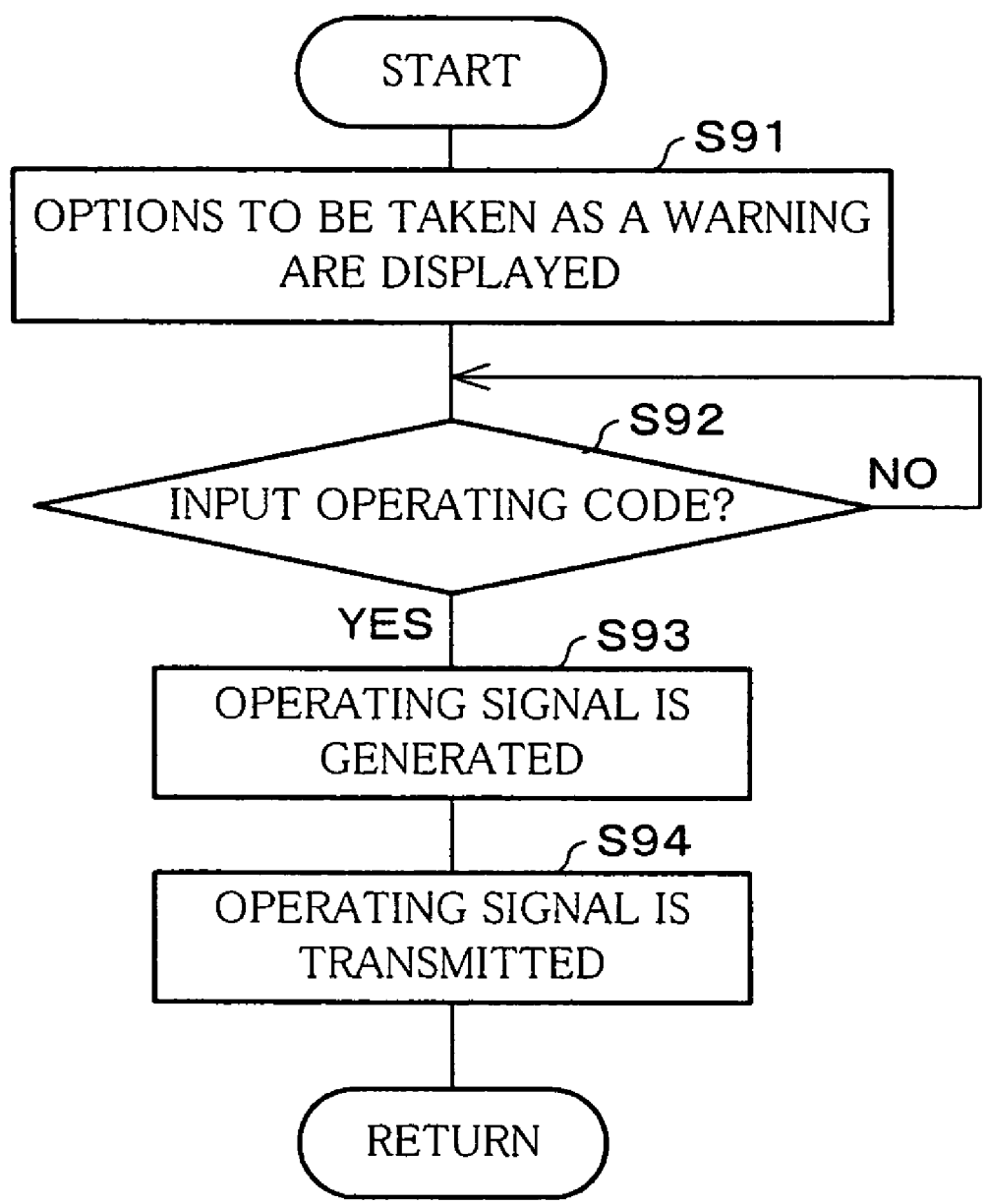
FIG. 8 is a flow chart, specifically showing a warning process in the flow chart in FIG. 6.

FIG. 1 is a functional block diagram, showing functional blocks concerning the operation of the vehicle theft monitoring system. FIGS. 6–8 are flow charts illustrating the flow of steps carried out in the vehicle theft monitoring system. Note that, some of the constituent parts shown in FIGS. 3–5 are omitted from FIG. 1, and the following descriptions are given on the assumption that the vehicle monitoring apparatus 1 is in the vehicle monitoring mode.

As described above, the present vehicle theft monitoring system (monitoring system) is made up of the vehicle monitoring apparatus (monitoring apparatus) 1, center apparatus (data distribution apparatus) 2, and mobile communication device (mobile communication apparatus) 3. Note that, the center apparatus 2 is not an elemental constituent part of the present vehicle theft monitoring system. A case when the center apparatus 2 is necessary will be described later.

The vehicle monitoring apparatus 1 is provided in a vehicle which is a monitoring object. The vehicle monitoring apparatus 1 is made up of an in-vehicle sensor net (sensing unit) 21 which senses the state of the vehicle and a vehicle sensor net gateway 20 which collects sensing data indicating the result of sensing by the in-vehicle sensor net 21, so as to send the sensing data to the mobile communication device 3. In the vehicle, furthermore, an alarm unit 22 for giving a warning against those who having caused abnormality on the vehicle.

The mobile communication device 3 is detachable from the vehicle and the vehicle monitoring apparatus 1, and can perform data transmission with the vehicle sensor net gateway board 20 of the vehicle monitoring apparatus 1, through the intermediary of the communication network 4.

When the state of the vehicle is sensed by the in-vehicle sensor net 21 so that the sensing data is supplied, the vehicle sensor net gateway board 20 under the control of the on-board control unit 60 transmits the sensing data to the mobile communication device 3, through the intermediary of the in-vehicle sensor net interface 64, A/D-D/A converter 61, and on-board communication unit 65 (cf. FIG. 3), and the communication network 4 (Step S1).

The sensing data is transmitted, for instance, in the following manner. When a sensor 21a such as a vibration sensor and acoustic sensor for sensing certain physical values senses that the physical value exceeds a predetermined threshold value, the sensor 21a automatically sends sensing data indicating the physical value to the vehicle sensor net gateway board 20, as a sensing result (this process is termed sensor proposition) Meanwhile, when a sensor 21a such as a door sensor and a bonnet sensor for sensing changes in state senses a change in state, the sensor 21a automatically sends sensing data indicating the change to the vehicle sensor net gateway board 20, as a sensing result (also sensor proposition). Upon receiving a predetermined instruction from the on-board control unit 60, the sensors 21a send the sets of sensing data indicating the sensing results at the moment of receiving the instruction to the vehicle sensor net gateway board 20. Each time receiving the sensing data from the sensors 21a, the vehicle sensor net gateway board 20 supplies the sensing data to the mobile communication device 3.

Note that, the way of sending the sensing data is not limited to the above. The sending of the sensing data can be performed in any wise, as long as the sensing data is sent to the mobile communication device 3 in a short period of time after abnormality regarding the vehicle is sensed.

Also noted that, the sensing data includes not only a sensing result indicating a physical value or a change in state but also data indicating the type of the sensor 21a having carried out the sensing.

The mobile communication device 3 receives the sensing data sent from the vehicle sensor net gateway 20, by the communication unit (receiving unit) 42 (Step S2).

The received sensing data is then supplied to the control unit 41. The control unit 41 judges an abnormality level indicating the abnormality concerning the vehicle, based on the sensing data (judgment process, Step S3).

On this occasion, the control unit 41 functions as a judgment unit 41a. The judgment unit 41a carries out the judgment process in reference to judgment process data stored in the storage unit 43. The judgment process data includes data for specifying the sequence of the process carried out in the control unit 41 (e.g. an executable code program, intermediate code program, and source program), and data used in the process. Note that, the judgment unit 41a may be constituted by a purpose-built processing circuit formed in the control unit 41.

The judgment process is, for instance, carried out in the following manner (cf. FIG. 7). First, based on the sending data, the contents of the sensing data, i.e. the type of the sensor 21a carried out the sensing and the sensing result, are identified (Step S31).

Then whether or not abnormality concerning the vehicle is occurring is determined in reference to the result of the identification (Step S32). If determined that the abnormality is occurring, the abnormality level is judged in accordance with the sensing data (Step S33). If determined that the abnormality is not occurring, sets of sensing data are collected from other sensors 21a for confirmation (Step S34), and the abnormality level is judged in accordance with the collected sets of sensing data (Step S35). Note that, these Steps S32–S35 may be omitted.

The judgment of the abnormality level is carried out in reference to, for instance, a table defining coordination between abnormality levels and sensing results of respective sensors 21a. This table is set in the storage unit 43, and may be included in the judgment process data.

FIG. 9 shows an example of such a table. Note that, the table in FIG. 9 is used for the judgment in Step S33.

For instance, if the sensing data is supplied from a vibration sensor and the sensing result indicates the vibration of the vehicle, there is a possibility that the vehicle is vibrated due to reasons such as wind and earthquake. Such a case that cannot be affirmed as human-driven is judged to be abnormality level 1. Apart from this, for instance, the sensing of a sound by an acoustic sensor is also judged to be the abnormality level 1.

If the sending data is supplied from a door sensor and the sensing result indicates the opening/closing of a door, a certain human-driven influence is obviously exerted on the vehicle but this does not necessarily mean a preparation of theft, because there is such a possibility that someone like a family member opened the door using a spare key. Such a case that is obviously human-driven but not necessarily mean a preparation of theft is determined to be abnormality level 2. Apart from this, for instance, opening/closing of a trunk sensed by a trunk room sensor is also determined to be the abnormality level 2.

If the sensing data is supplied from a key cylinder sensor and the sensing result indicates an abnormality of a key cylinder, e.g. picking off the key cylinder, it is generally perceived that a preparation of theft is in progress. Such a case that a preparation of theft is almost certainly in progress is determined to be abnormality level 3.

Note that, the above-mentioned judgments of abnormality levels are merely examples, and the way of making judgments varies with factors such as the types and arrangement of sensors 21a in the vehicle and the circumstances of the use of the vehicle. Further, instead of using the above-mentioned table, the abnormality levels may be figured out by carrying out, in the judgment unit 41a, a predetermined calculation based on the sensing data.

After determining the abnormality level as the judgment result in the manner as above, the control unit 41 determines a report destination in accordance with the abnormality level (determination process) (Step S4).

On this occasion, the control unit 41 functions as a decision unit 41b. This decision unit 41b carries out the determination process in accordance with determination process data stored in the storage unit 43. The determination process data includes data for specifying the sequence of the process carried out in the control unit 41 (e.g. an executable code program, intermediate code program, and source program), and data used in the process. Note that, the judgment unit 41b may be constituted by a purpose-built processing circuit formed in the control unit 41.

The determination of the report destination is also carried out with reference to, for instance, a table defining coordination between abnormality levels and data of report destinations (i.e. report destination data) such as telephone numbers. This table is set in the storage unit 43, and may be included in the determination process data.

FIG. 10 shows an example of such a table. When the abnormality level is 1, as in the foregoing description, it is uncertain whether or not the abnormality concerning the vehicle is human-driven, and hence a preparation for theft may not be in progress. For this reason, the report destination is determined to be, for instance, a security company under contract with the user, in order to ask them to go on a patrol around the vehicle.

When the abnormality level is 2, a certain human-driven influence is obviously exerted on the vehicle but this does not necessarily mean a preparation of theft, because there is such a possibility that someone like a family member is getting into the vehicle. For this reason, the report destination is determined to be a home of the user, in order to call the family member.

When the abnormality level is 3, a preparation of theft is almost certainly in progress, so that the report destination is determined to be a police station.

Note that, although the descriptions above presuppose that the judgment process and determination process are carried out in accordance with the sensing data, the following arrangement is more preferable: in addition to the sensing data, location data indicating the location of the vehicle is transmitted from the vehicle monitoring apparatus 1, the communication unit 42 receives these sensing data and location data, the judgment unit 41a carries out the judgment process in accordance with the sensing data and location data, and the decision unit 41b carries out the determination process in accordance with the sensing data and location data. With this, it is possible to determine the report destination, also taking into consideration of the location of the vehicle. For this reason, this makes it possible to more suitably determine the report destination.

To realize the above-mentioned arrangement, a location identifying device for generating location data is provided in the vehicle monitoring apparatus 1. This location identifying device acquires position information using, for instance, the GPS (Global Positioning System) which utilizes location survey information supplied from satellites, or location sensing function which utilizes information supplied from base stations of wireless telephony communication.

After determining the abnormality level and the report destination, the control unit 41 causes the LCD 44 to display the abnormality level and the report destination (Step S5), and then waits for the user to input, using the keypad 45, an input code indicating whether or not making a call to the selected report destination (Step S6). The input code is a code supplied to the control unit 41, when a predetermined key of the keypad 45, which is associated with the determination whether or not making a call, is pushed.

When determined that a call is made, the control unit 41 establishes a connection between the communication unit 42 and the selected report destination (Step S7), and to the report destination, the user makes a call and notifies the abnormality concerning the vehicle, a request of patrol, and so on.

In this manner, the present monitoring system is arranged as follows: The state (abnormality) of the vehicle is sensed, and sensing data indicating the sensing result is supplied to the mobile communication device 3. In the mobile communication device 3, the judgment unit 41a judges the state of the vehicle in accordance with the sensing data, and in accordance with the judgment result, the report destination is determined by the decision unit 41b. Thus, it is possible to smoothly make a report to a report destination suitable for the type of abnormality of the vehicle, so that the occurrence of abnormality is quickly reported to a suitable report destination.

After making the report, the control unit 41 waits for the user to input, using the keypad 45, an input code indicating whether or not a warning is carried out by the alarm unit 22 (Step S8). This input code is a code supplied to the control unit 41, when a predetermined key of the keypad 45, which is associated with the determination whether or not a warning is carried out, is pushed.

When determined to carryout the warning, the control unit 41 carries out a warning process (Step S9). On this occasion, the control unit 41 functions as a warning unit 41c. This warning unit 41c carries out the warning process, in accordance with warning process data stored in the storage unit 43. The warning process data includes data for specifying the sequence of the process carried out in the control unit 41 (e.g. an executable code program, intermediate code program, and source program), and data used in the process. Note that, the warning unit 41c may be constituted by a purpose-built processing circuit formed in the control unit 41.

The warning process is, for instance, carried out in the following manner (cf. FIG. 8). First, the LCD 44 displays options to be taken as a warning (Step S91). These options correspond to the setup of the alarm unit 22 provided in the vehicle, so as to include examples such as producing a warning sound from the speaker 22a, blowing the horn 22b, and forcibly stop the engine 22c when the same has been started up. Then an input of an input code (action code) for carrying out the warning corresponding to the selected option is awaited (Step S92). The input code is a code supplied to the control unit 41, when a predetermined key of the keypad 45, the key being associated with a specific option, is pushed. Subsequently, an operating signal for carrying out the warning corresponding to the input code is generated (Step S94), and then the generated operating signal is supplied from the communication unit (transmitting unit) 42 to the vehicle monitoring apparatus 1.

In the vehicle monitoring apparatus 1, the on-board communication unit 65 receives the operating signal, the on-board control unit 60 then supplies the received operating signal to an alarm unit controlling unit 63, and consequently the selected warning is carried out under the control of the alarm unit controlling unit 63.

In this manner, the warning is carried out in accordance with the user's instruction, so that an unnecessary issuance of warning in the event of, for instance, earthquake can be avoided.

If the judgment unit 41a, decision unit 41b, and warning unit 41c carry out the respective processes in accordance with the judgment process data, determination process data, and warning process data, these sets of process data may be stored in advance in the storage unit 43 of the mobile communication device 3. In this case, the present vehicle theft monitoring system is made up of the vehicle monitoring apparatus 1 and mobile communication device 3 on an existing communication network 4, thereby not requiring the center apparatus 2.

Alternatively, the present vehicle theft monitoring system may be arranged in such a manner that, with the center apparatus 2 being included, the mobile communication device 3 acquires, from the center apparatus 2, at least one of the judgment process data, determination process data, and warning process data as the need arises.

The center apparatus (data distribution apparatus) 2 includes the center storage unit 33 storing the sets of process data and the center communication unit (transmitting unit) 32 transmitting these sets of process data to the mobile communication device 3, and these units are controlled by the center control unit 31. In the mobile communication device 3, the process data transmitted from the center apparatus 2 is acquired by the communication unit (data acquisition unit) 42, and stored in the storage unit 43 under the control of the control unit 41.

With the arrangement above, the mobile communication device 3 can perform general processes specified by respective sets of process data, and the concrete processes are realized as combinations of these general processes specified by the respective sets of process data. Thus, a conventional mobile communication device can be adopted as the mobile communication device 3. That is to say, manufacturing costs can be reduced by (i) simplifying the structure of the mobile communication device 3 and (ii) providing a commonality among the mobile communication device 3 and conventional mobile communication devices. Furthermore, since sets of process data are downloaded from the center apparatus 2, the latest software is always available to the mobile communication device 3.

A control unit, e.g. CPU, of present-day mobile communication devices such as mobile phones has a processing power equal to that of general-purpose computers of the old time, so that on some mobile communication devices, even application software can run. Utilizing this high processing power, the present system can reduce the traffic and improve an overall performance of the system, by distributing the load of the monitoring apparatus such as a conventional response center to a plurality of mobile communication devices 3.

According to the descriptions above, data transmission is carried out between the communication unit 42 of the mobile communication device 3 and the on-board communication unit 65 of the vehicle monitoring apparatus 1, via the communication network 4. Instead of this, the data transmission between these devices may be carried out by means of short-range wireless communication. Examples of the short-range wireless communication includes LAN (Local Area Network) standard at 11 Mbps in the 2.4 GHz band, and Bluetooth™ using an weak radio wave. A standard transmittable distance of such short-range wireless communications is typically within the range of few score meter to few hundred meter within doors. Thus, this arrangement can be used as a simplified vehicle theft monitoring system for carrying out the above-mentioned processes by a mobile communication device 3 in the house, when an abnormality occurs in a vehicle in the garage of the user.

According to the above-mentioned descriptions, the judgment process and determination process are carried out by the mobile communication device 3. However, these processes may be carried out by the on-board control unit 60 of the vehicle monitoring apparatus 1.

Figure 11:
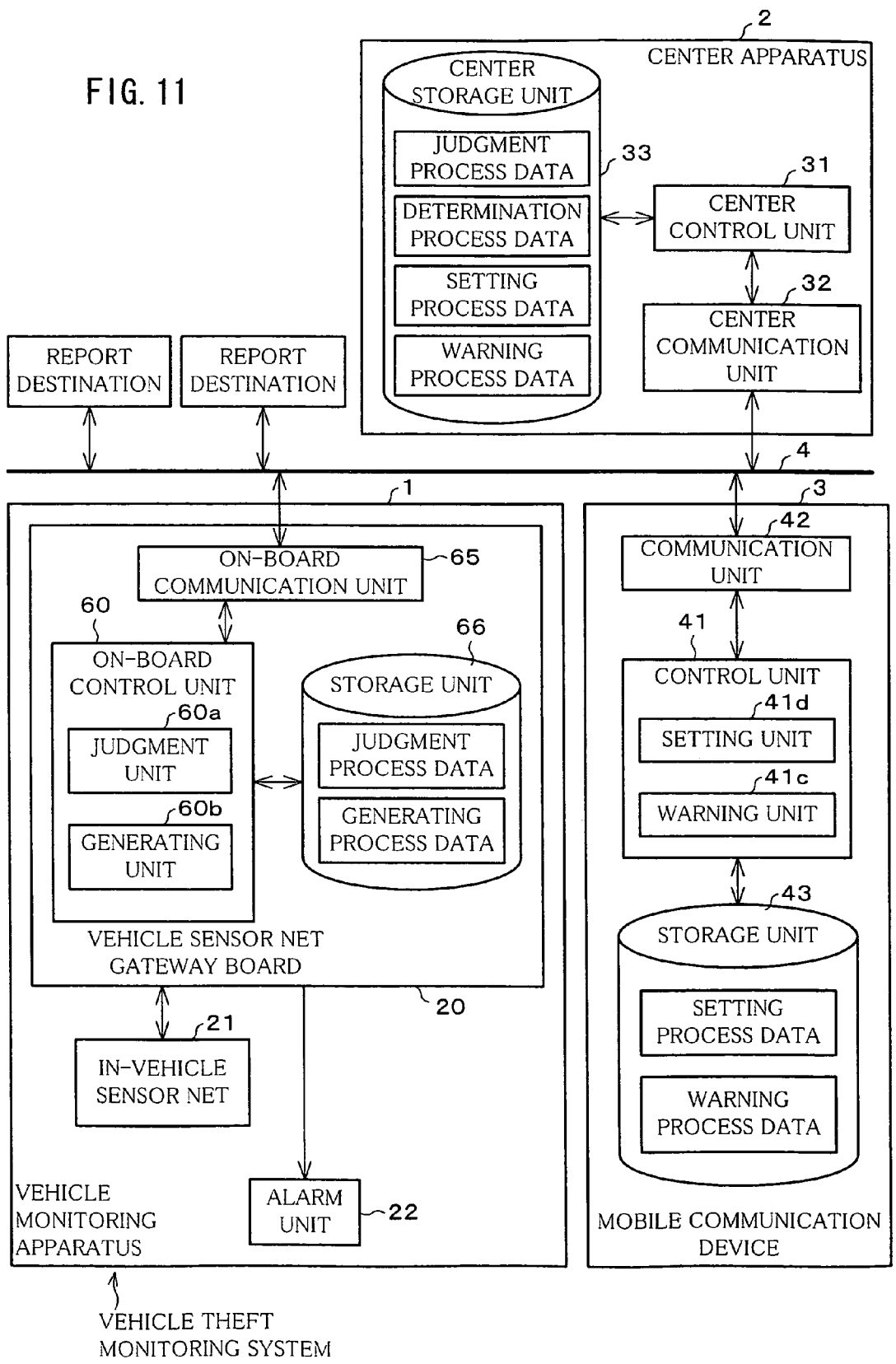
FIG. 11 is a function block diagram, illustrating an alternative arrangement of the vehicle theft monitoring system in FIG. 1.

In this case, an arrangement illustrated in FIG. 11 is implemented: A vehicle monitoring apparatus (monitoring apparatus) 1 includes: an in-vehicle sensor net (sensing unit) 21 for sensing the state of a vehicle; a judgment unit 60a for judging the level of abnormality concerning the vehicle, in accordance with the sensing result supplied from the in-vehicle sensor net 21; a generating unit 60b for generating data (report destination data) for specifying a report destination to which report is made by the mobile communication device 3 in accordance with the judgment result by the judgment unit 60a; and an on-board communication unit (transmitting unit) 65 for transmitting the report destination data to the mobile communication device 3. Note that, the on-board control unit 60 functions as the judgment unit 60a and generating unit 60b.

In the mobile communication device 3, the report destination data having been transmitted from the vehicle monitoring apparatus 1 is received by a communication unit (receiving unit) 42, and in accordance with the report destination data, the control unit 41 sets the report destination (setting process). On this occasion, the control unit functions as a setting unit 41d. After carrying out this setting process, the processes identical with the above (i.e. processes after Step S5 in FIG. 6) are carried out.

Also in this case, the judgment unit 60a and generating unit 60b carry out the determination process and generating process in accordance with the determination process data and generating process data stored in the storage unit 66, respectively, and each of these determination process data and generating process data includes data for specifying the sequence of the process carried out in the on-board control unit 60 (e.g. an executable code program, intermediate code program, and source program), and data used in the process. Furthermore, these determination process data and generating process data may be stored in advance in the storage unit 66 of the vehicle monitoring apparatus 1, or may be acquired form the center apparatus 2. The setting unit 41d carries out the setting process in accordance with the setting process data stored in the storage unit 43, and this setting process data includes data for specifying the sequence of the process carried out in the control unit 41 (e.g. an executable code program, intermediate code program, and source program), and data used in the process. The setting process data may be stored in advance in the storage unit 43 of the mobile communication device 3, or may be acquired form the center apparatus 2.

The present embodiment has described the vehicle theft monitoring system, as a monitoring system in accordance with the present invention. However, not being limited to this, the monitoring system of the present invention can be used as, for instance, a home security monitoring system for monitoring an empty home.

The mobile communication apparatus of the present invention is preferably: detachable from a monitoring apparatus that senses a state of a monitoring object, transmits sensing data indicating a sensing result, and is provided in the monitoring object; and connectable to a report destination via a communication network, and comprises: a receiving unit for receiving the sensing data; a judgment unit for judging the state of the monitoring object, in accordance with the sensing data; a decision unit for determining a report destination to which connection should be made, in accordance with a judgment result produced by the judgment unit; and a communication unit for establishing connection to the report destination determined by the decision unit.

According to the above-described arrangement, the state of a monitoring object is sensed, and then sensing data indicating the sensing result is supplied to a mobile communication apparatus. This mobile communication apparatus is provided independently of the monitoring object, so that the user can carry the mobile communication apparatus. In this mobile communication apparatus, a judgment unit judges the state of the monitoring object, in accordance with the sensing data, and a decision unit determines a report destination in accordance with the judgment result. Thus, it is possible to smoothly make a report to a report destination suitable for the type of abnormality of the monitoring object, so that the occurrence of abnormality is quickly reported to a suitable report destination.

The above-mentioned mobile communication apparatus of the present invention preferably further comprises a data acquisition unit for acquiring judgment process data defining a judgment process carried out by the judgment unit, from a data distribution apparatus provided independently of the mobile communication apparatus, the judgment unit carrying out the judgment process, in accordance with the judgment process data.

The above-mentioned mobile communication apparatus of the present invention is preferably further comprises a data acquisition unit for acquiring determination process data defining a determination process carried out by the decision unit, from a data distribution apparatus provided independently of the mobile communication apparatus, the decision unit carrying out the determination process, in accordance with the determination process data.

It is troublesome that carrying out the judgment process and determination process by the mobile communication apparatus complicates the structure of the mobile communication apparatus, thereby increasing manufacturing costs thereof.

On the contrary, in the arrangement above, the judgment unit and decision unit carry out the respective processes, in accordance with the judgment process data and determination process data, so that the judgment process data and determination process data can be supplied from the data distribution apparatus which is provided independently of the mobile communication apparatus. On this account, the mobile communication apparatus can perform general processes specified by respective sets of process data, and the concrete processes are realized as combinations of these general processes specified by the respective sets of process data. With this, manufacturing costs can be reduced by (i) simplifying the structure of the mobile communication apparatus and (ii) providing a commonality among the mobile communication apparatus and conventional mobile communication apparatuses.

The above-mentioned mobile communication apparatus of the present invention preferably further comprises: a transmitting unit for transmitting an operating signal which causes an alarm unit provided in the monitoring object to operate, in order to issue a warning to a person causing abnormality of the monitoring object; an inputting unit for inputting an operating code for operating the alarm unit; and a warning unit for generating the operating signal in accordance with the operating code, and transmitting the operating signal to the transmitting unit.

According to this arrangement, the user of the mobile communication apparatus inputs an operating code using an inputting unit so as to cause an alarm unit provided in the monitoring object to operate and issue a warning to a person causing abnormality of the monitoring object. In this manner, the warning is carried out in accordance with the user's instruction, so that an unnecessary issuance of warning can be avoided.

The monitoring system of the present invention may comprise the above-mentioned mobile communication apparatus and the above-mentioned monitoring apparatus.

The monitoring system of the present invention may comprise the above-mentioned mobile communication apparatus, the above-mentioned monitoring apparatus, and the above-mentioned data distribution apparatus, the data distribution apparatus including: a storage unit for storing the judgment process data; and a transmitting unit for transmitting the judgment process data.

The monitoring system of the present invention may comprise the above-mentioned mobile communication apparatus, the above-mentioned monitoring apparatus, and the above-mentioned data distribution apparatus, the data distribution apparatus including: a storage unit for storing the determination process data; and a transmitting unit for transmitting the determination process data.

The mobile communication apparatus of the present invention, which is provided in a monitoring object and can carry out data transmission with a mobile communication apparatus which is provided independently of the monitoring object, may comprise: a sensing unit for sensing a state of the monitoring object; a judgment unit for judging the state of the monitoring object, in accordance with a sensing result produced by the sensing unit; a generating unit for generating, in accordance with a judgment result produced by the judgment unit, report destination data which specifies a report destination to which a report should be made by the mobile communication apparatus; and a transmitting unit for transmitting the report destination data to the mobile communication apparatus.

As in this arrangement, it is possible to obtain effects similar to those of the above-described mobile communication apparatus, by judging the state of the monitoring object in the monitoring apparatus provided in the monitoring object, and determining the report destination in accordance with the judgment result.

The mobile communication apparatus of the present invention preferably further comprises a data acquisition unit for acquiring judgment process data defining a judgment process carried out by the judgment unit, from a data distribution apparatus provided independently of the mobile communication apparatus, the judgment unit carrying out the judgment process in accordance with the judgment process data.

The mobile communication apparatus of the present invention preferably further comprises a data acquisition unit for acquiring generating process data defining a generating process carried out by the generating unit, from a data distribution apparatus provided independently of the mobile communication apparatus, the generating unit carrying out the generating process in accordance with the generating process data.

According to this arrangement, also in the monitoring apparatus, the sets of process data are acquired from the data distribution apparatus. With this, manufacturing costs can be reduced by (i) simplifying the structure of the mobile communication apparatus and (ii) providing a commonality among the mobile communication apparatus and conventional mobile communication apparatuses.

The monitoring system of the present invention may comprise the above-mentioned monitoring apparatus and the above-mentioned data distribution apparatus, the data distribution apparatus including: a storage unit for storing the judgment process data; and a transmitting unit for transmitting the judgment process data.

The monitoring system of the present invention may comprise the above-mentioned monitoring apparatus and the above-mentioned data distribution apparatus, the data distribution apparatus including: a storage unit or storing the generating process data; and a transmitting unit for transmitting the generating process data.

The objective of the present invention can also be realized by the following arrangement: A computer-readable recording medium, in which program codes (an executable code program, intermediate code program, and source program) of a monitoring program for realizing the functions of the above-mentioned monitoring system are recorded, is provided to a system or device, and computers (or a member such as CPU, MPU, and DSP) of respective apparatuses constituting the monitoring system read out the program codes from the recording medium and execute them. In this case, the program codes read out from the recording medium realize the above-mentioned functions, so that the recording medium recording these codes constitutes the present invention.

For instance, the judgment unit 41a, decision unit 41b, and warning unit 41c, which are provided in the control unit 41 of the mobile communication device 3, are realized by executing, by a microprocessor and the like, a predetermined program (monitoring program) stored in a memory (not illustrated) of the mobile communication device 3. Similarly, the judgment unit 60a and generating unit 60b, which are provided in the on-board control unit 60 of the vehicle monitoring apparatus 1, are realized by executing, by a microprocessor and the like, a predetermined program (monitoring program) stored in a memory (not illustrated) of the vehicle monitoring apparatus 1.

The recording medium for supplying the above-described program codes may be detachable from the system or device. The recording medium may be a medium solidly records the program codes in a readable manner. Further, the recording medium may be inserted into the system or device in such a way that the computer can directly read out the recorded program codes, or may be read through the intermediary of a program reading device which is, as an external storage device, connected to the system or device.

Examples of this recording medium includes tapes such as magnetic tapes and cassette tapes, disks including magnetic disks such as Floppy® disks and hard disks and optical disks such as CD-ROM, MO, MD, DVD, and CD-R, cards such as IC cards (including memory cards) and optical cards, and semiconductor memories such as mask ROM, EPROM, EEPROM, and flash ROM.

The program codes may be recorded in the following manner: The computer can read out the program codes from the recording medium and directly execute them, or the program codes are transferred from the recording medium to a program recording area of a main storage, and then the computer reads out the program codes from the main storage and executes them.

Another way of supplying the program codes is arranged such that the system or device can be connected to a communication network, and the program codes are supplied via the communication network. Nonexclusive examples of the communication network includes the Internet, intranet, extranet, LAN, ISDN, VAN, CATV communication network, virtual private network, telephone network, mobile communication network, and satellite communication network. Nonexclusive examples of transmission media constituting the communication network are cables such as IEEE1394, USB, power-line carrier, cable TV lines, telephone lines, ADSL lines, and wireless connections such as IrDA and remote control using infrared light, Bluetooth®, 802.11, HDR, mobile phones, satellite connections, and terrestrial digital broadcasting.

Note that, the description above assumes that a program for reading out the program codes and recording them to the main storage and a program for downloading the program codes from the communication network are stored in the system or device in advance, in a computer-readable manner.

The above-mentioned functions can be not only realized by executing the foregoing program codes read out by the computer but also realized by executing at least a part of the actual processes by an OS running on the computer, under the instruction of the program codes.

The above-mentioned functions, furthermore, can be realized in the following manner: the program codes having been read out by the computer is written in a memory in a feature expansion board provided in the computer or a feature expansion unit connected to the computer, and then under the instruction of these program codes, a member such as a CPU of the feature expansion board or unit executes at least a part of the actual process.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, the mobile communication apparatus, monitoring apparatus, and monitoring system of the present invention can be generally adopted to monitoring systems for monitoring a monitoring object, and particularly suitable for vehicle theft monitoring systems and home security monitoring systems.

The invention claimed is:

1. A mobile communication apparatus which is:
   detachable from a monitoring apparatus that senses a state of a monitoring object, transmits sensing data indicating a sensing result, and is provided in the monitoring object; and
   connectable to a report destination via a communication network, the mobile communication apparatus comprising:
   a receiving unit for receiving the sensing data from the monitoring apparatus over the communication network;
   a judgment unit for judging the state of the monitoring object, in accordance with the sensing data;
   a decision unit for determining a report destination to which connection is to be made, in accordance with a judgment result produced by the judgment unit; and
   a communication unit for establishing connection to the report destination determined by the decision unit.

2. The mobile communication apparatus as defined in claim 1, further comprising a data acquisition unit for acquiring judgment process data defining a judgment process carried out by the judgment unit, from a data distribution apparatus provided independently of the mobile communication apparatus, the judgment unit carrying out the judgment process, in accordance with the judgment process data.

3. The mobile communication apparatus as defined in claim 1, further comprising a data acquisition unit for acquiring determination process data defining a determination process carried out by the decision unit, from a data distribution apparatus provided independently of the mobile communication apparatus, the decision unit carrying out the determination process, in accordance with the determination process data.

4. The mobile communication apparatus as defined in claim 1, further comprising:
   a transmitting unit for transmitting an operating signal which causes an alarm unit provided in the monitoring object to operate, in order to issue a warning to a person causing abnormality of the monitoring object;
   an inputting unit for inputting an operating code for operating the alarm unit; and
   a warning unit for generating the operating signal in accordance with the operating code, and transmitting the operating signal to the transmitting unit.

5. A monitoring system, comprising the mobile communication apparatus and the monitoring apparatus which are defined in claim 1.

6. A monitoring system comprising the mobile communication apparatus, the monitoring apparatus, and the data distribution apparatus which are defined in claim 2,
   the data distribution apparatus including:
      a storage unit for storing the judgment process data; and
      a transmitting unit for transmitting the judgment process data.

7. A monitoring system, comprising the mobile communication apparatus, the monitoring apparatus, and the data distribution apparatus which are defined in claim 3,
   the data distribution apparatus including:
      a storage unit for storing the determination process data; and
      a transmitting unit for transmitting the determination process data.

8. A monitoring apparatus which is provided in a monitoring object and can carry out data transmission with a mobile communication apparatus which is provided independently of the monitoring object,
   the monitoring apparatus comprising:
      a sensing unit for sensing a state of the monitoring object;
      a judgment unit for judging the state of the monitoring object, in accordance with a sensing result produced by the sensing unit;
      a generating unit for generating, in accordance with a judgment result produced by the judgment unit, report destination data which specifies a report destination to which a report is to be made by the mobile communication apparatus; and
      a transmitting unit for transmitting the report destination data to the mobile communication apparatus via a communication network.

9. The monitoring apparatus as defined in claim 8, further comprising a data acquisition unit for acquiring judgment process data defining a judgment process carried out by the judgment unit, from a data distribution apparatus provided independently of the mobile communication apparatus, the judgment unit carrying out the judgment process in accordance with the judgment process data.

10. The monitoring apparatus as defined in claim 8, further comprising a data acquisition unit for acquiring generating process data defining a generating process carried out by the generating unit, from a data distribution apparatus provided independently of the mobile communication apparatus, the generating unit carrying out the generating process in accordance with the generating process data.

11. A monitoring system comprising the monitoring apparatus and the data distribution apparatus which are defined in claim 10,
   the data distribution apparatus including:
      a storage unit for storing the judgment process data; and
      a transmitting unit for transmitting the judgment process data.

12. A monitoring system comprising the monitoring apparatus and the data distribution apparatus which are defined in claim 10,
   the data distribution apparatus including:
      a storage unit or storing the generating process data; and
      a transmitting unit for transmitting the generating process data.

13. A monitoring method practiced by a monitoring system including a monitoring apparatus provided in a monitoring object and a mobile communication apparatus provided independently of the monitoring apparatus, the method comprising the steps of:
   (i) receiving via a communication network from the monitoring apparatus, sensing data which indicates a sensing result of a state of the monitoring object;
   (ii) judging the state of the monitoring object, in accordance with the sensing data received in step (i);
   (iii) determining a report destination to which connection is to be made, in accordance with a judgment result produced in the step (ii); and
   (iv) establishing connection with the report destination which has been determined in the step (iii).

14. A monitoring program for operating the mobile communication apparatus defined in claim 1, the monitoring program causing a computer to function as the units defined in claim 1.

15. A monitoring program for operating the mobile communication apparatus defined in claim 8, the monitoring program causing a computer to function as the units defined in claim 8.

16. A computer-readable recording medium, recording the monitoring program defined in claim 14.

17. The mobile communication apparatus as defined in claim 1, wherein the decision unit selects one report destination from a plurality of report destinations.

18. The mobile communication apparatus as defined in claim 1, wherein the mobile communication apparatus receives sensing data from the monitoring apparatus when attached to the monitoring apparatus and when detached from the monitoring apparatus.

19. The mobile communication apparatus as defined in claim 1, wherein the judgment result produced by the judgment unit includes an abnormality level, selected from a plurality of at least three abnormality levels.

20. A mobile communication apparatus which is:
detachable from a monitoring apparatus that senses a state of a monitoring object, transmits sensing data indicating a sensing result, and is provided in the monitoring object; and
connectable to a report destination via a communication network, the mobile communication apparatus comprising:
- a receiving means for receiving the sensing data from the monitoring apparatus via the communication network;
- a judgment means for judging the state of the monitoring object, in accordance with the sensing data;
- a decision means for determining a report destination to which connection is to be made, in accordance with a judgment result produced by the judgment means; and
- a communication means for establishing connection to the report destination determined by the decision means.

21. A monitoring apparatus which is provided in a monitoring object and can carry out data transmission with a mobile communication apparatus which is provided independently of the monitoring object,
the monitoring apparatus comprising:
- a sensing means for sensing a state of the monitoring object;
- a judgment means for judging the state of the monitoring object, in accordance with a sensing result produced by the sensing means;
- a generating means for generating, in accordance with a judgment result produced by the judgment means, report destination data which specifies a report destination to which a report is to be made by the mobile communication apparatus; and
- a transmitting means for transmitting the report destination data to the mobile communication apparatus via a communication network.

* * * * *